(No Model.)

S. R. DUMMER.
JUICE EXTRACTOR FOR LEMONS, &c.

No. 562,125.                      Patented June 16, 1896.

Witnesses:
Raphaël Netter,
James N. Catlow.

Samuel R. Dummer,
Inventor
by Duncan & Page Att'ys.

UNITED STATES PATENT OFFICE.

SAMUEL R. DUMMER, OF FLUSHING, NEW YORK.

JUICE-EXTRACTOR FOR LEMONS, &c.

SPECIFICATION forming part of Letters Patent No. 562,125, dated June 16, 1896.

Application filed September 3, 1895. Serial No. 561,177. (No model.)

*To all whom it may concern:*

Be it known that I, SAMUEL R. DUMMER, a citizen of the United States, residing in Flushing, in the county of Queens and State of New York, have invented certain new and useful Improvements in Juice-Extractors for Lemons, Limes, and Similar Fruits, of which the following is a specification, reference being made to the drawings constituting part of the same.

The present invention relates to the class of devices for extracting juices from lemons, limes, oranges, and similar fruits by forcing sections or halves of the fruit down over a conical and roughened surface with a twisting and oscillatory movement, whereby the juice, pulp, and seeds are removed from the rind.

The invention, generally stated, consists in providing the conical portion of the extractor with slits or openings which coöperate with cutting ribs or projections located adjacent to such openings to more quickly release the pulp and juice and permit the latter to pass directly through the slits or openings into the interior of the cone and thence to a receiving vessel; also in providing an opening in the apex of the cone with cutting edges, and in providing the exit of the extractor with a removable strainer, all substantially as hereinafter more fully described and claimed.

Figure 1:
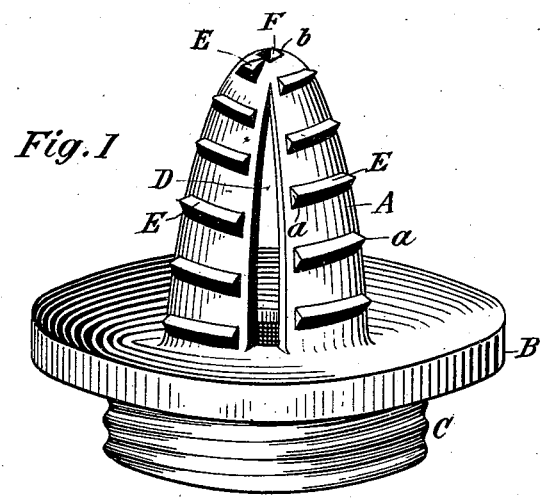
Figure 2:
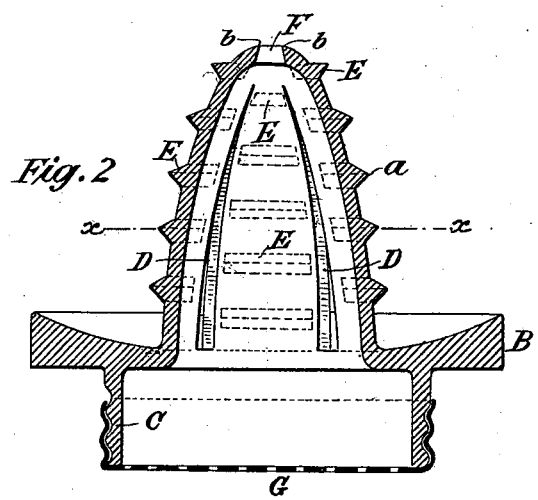
Figure 3:
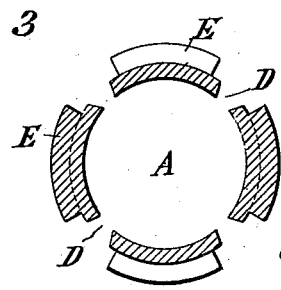

By reference to the accompanying drawings, Figure 1 is a view in perspective of a juice-extractor containing my invention. Fig. 2 is a central longitudinal section of the same, and Fig. 3 is a cross-section through the line *x x* of Fig. 2.

In the drawings, A represents the cone-shaped portion of the extractor attached to a base B, which is provided with a downwardly-projective flange C.

The conical part A is hollow, and is provided with slits or openings D, extending preferably from the base upward to near the apex of the cone, and thus partially dividing the cone into sections, preferably four in number. Each of these sections is provided with ribs or projections E, which extend along or around the face of the sections, preferably at nearly right angles to the longitudinal axis of the cone. The ends of these ribs preferably extend out nearly flush with the edges of the slits and furnish cutting edges or plows to enter and remove the pulp of the fruit. The arrangement of the ribs of the adjacent sections is preferably such that the ends of the ribs of one section alternate with those of the next adjacent sections as distinguished from being in the same line, so that the ribs of one section will cut the pulp in different places from those of a preceding or succeeding section. The shape of these ribs in cross-section is preferably triangular, the outer edge or apex *a* being quite sharp.

The advantages of the construction of the cone-shaped part A, as above described and shown in the drawings, are that as the section of the fruit operated upon is forced down over the conical extractor with the usual twisting and oscillatory movement the pulp will be forced into the openings D and the cutting-ribs of the sections will be enabled to take a deeper hold upon the pulp to more quickly cut and remove the same than if the face of the cone were solid. The edges of the slits or openings D are effective to remove the pulp which has been loosened and partially displaced by the action of the ribs E and to force the juice therefrom. At the same time a large portion of the juice is discharged directly into the interior of the cone and into any convenient receptacle placed beneath.

At the apex of the cone there is an aperture F, of polygonal form, whose walls form a series of straight cutting edges *b*. This aperture is shown in the drawings as being square in outline, with four cutting edges. Under pressure and oscillation of the fruit operated upon these cutting edges operate to cut out the central part of the fruit, and are especially serviceable in removing the last portion of the pulp and juice from the top of the fruit-section.

The base B is sufficiently concave to prevent the overflow of any juice, pulp, or seeds which have not passed through the openings D and F in the cone and cause the juice to flow to the exit beneath the cone. This base is also of sufficient diameter to afford a support for the entire device upon the rim of a tumbler or other vessel for receiving the juice.

The downwardly-projecting flange C serves the twofold purpose of retaining the extractor in position upon the receiving vessel and as a support or attachment for a removable strainer.

G is a removable strainer, which is secured by any suitable means to the flange C underneath the base B. This strainer may be conveniently struck up from sheet metal and be attached to the flange C by screw-threads formed on the corresponding parts, as shown in the drawings. It furnishes a convenient device for freeing the juice from the pulp and any seeds which may have passed through the slits or openings into the interior of the cone, and can be readily removed, cleansed, and replaced.

The extractor above described, with the exception of the strainer G, can be cheaply formed in a single piece from glass or metal by the usual operations of molding or casting.

It is observed that while it is preferred that the ribs E should be arranged, as shown in the drawings, substantially at right angles to the axis of the cone, I do not desire to limit the invention to this position, as such ribs may be arranged at a greater or less angle to such axis, or the ribs of every alternate section may be so arranged, without materially affecting their operation or departing from the principle of the invention.

It is further remarked that the terms "conical," "cone-shaped," and "cone" herein used are not intended to limit the invention to the exact shape which might be implied by those terms. It is understood that the form of this part of the extractor may be changed to adapt it to different-shaped fruits to be treated.

What is claimed as new is—

1. In a juice-extractor, a hollow cone-shaped part provided with slits or openings extending upwardly from its base and transverse projecting ribs extending between said slits or openings, substantially as and for the purpose set forth.

2. In a juice-extractor, a hollow cone-shaped part provided with slits or openings extending upwardly from its base, transverse cutting ribs or projections extending between said slits or openings and arranged to alternate with each other on either side of the slits or openings, substantially as and for the purpose set forth.

3. In a juice-extractor, a hollow cone-shaped part provided with longitudinal slits or openings and transverse cutting-ribs extending between said slits or openings and having an aperture in its apex provided with straight cutting edges, substantially as and for the purpose set forth.

4. In a juice-extractor, the combination with a cone-shaped part provided with ribs and projections extending transversely between longitudinal slits or openings, of a base provided with a downwardly-projecting flange surrounding the juice discharge or exit and located beneath the cone-shaped part, and a removable strainer, substantially as and for the purpose set forth.

SAMUEL R. DUMMER.

Witnesses:
ROBT. F. GAYLORD,
ERNEST HOPKINSON.